US 7,852,601 B1

(12) United States Patent
Little

(10) Patent No.: US 7,852,601 B1
(45) Date of Patent: Dec. 14, 2010

(54) RADIAL TOP COVER GASKET FOR DISK DRIVES

(75) Inventor: Aaron D. Little, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 389 days.

(21) Appl. No.: 11/582,791

(22) Filed: Oct. 18, 2006

(51) Int. Cl.
*G11B 33/14* (2006.01)
(52) U.S. Cl. .................................................. 360/97.02
(58) Field of Classification Search .............. 360/97.01, 360/97.02, 97.03, 98.01
See application file for complete search history.

(56) References Cited

U.S. PATENT DOCUMENTS

| 5,097,978 | A | * | 3/1992 | Eckerd | 220/315 |
|---|---|---|---|---|---|
| 5,223,996 | A | * | 6/1993 | Read et al. | 360/97.02 |
| 5,270,887 | A | | 12/1993 | Edwards et al. | |
| 5,276,577 | A | | 1/1994 | Brooks et al. | |
| 5,422,766 | A | | 6/1995 | Hack et al. | |
| 5,696,648 | A | * | 12/1997 | Jeong et al. | 360/97.02 |
| 5,703,734 | A | * | 12/1997 | Berberich et al. | 360/97.02 |
| 5,793,566 | A | * | 8/1998 | Scura et al. | 360/97.02 |
| 6,577,468 | B2 | | 6/2003 | Daniel et al. | |
| 6,631,049 | B2 | | 10/2003 | Satoh et al. | |
| 6,646,826 | B1 | | 11/2003 | Haidari et al. | |
| 6,769,699 | B2 | | 8/2004 | Seki et al. | |
| 6,850,387 | B2 | | 2/2005 | Daniel | |
| 6,876,515 | B2 | * | 4/2005 | Unno | 360/97.02 |
| 7,242,552 | B2 | * | 7/2007 | Kudo et al. | 360/97.02 |
| 7,245,497 | B2 | * | 7/2007 | Klein et al. | 361/752 |
| 7,362,541 | B2 | * | 4/2008 | Bernett et al. | 360/97.02 |
| 2002/0044376 | A1 | * | 4/2002 | Serizawa et al. | 360/97.02 |
| 2002/0089782 | A1 | * | 7/2002 | Hearn et al. | 360/97.02 |
| 2005/0104303 | A1 | * | 5/2005 | Kojima et al. | 277/650 |
| 2005/0253342 | A1 | * | 11/2005 | Hampton | 277/628 |
| 2006/0034010 | A1 | | 2/2006 | Abe et al. | |
| 2007/0278909 | A1 | * | 12/2007 | Xu et al. | 310/68 R |
| 2008/0150240 | A1 | * | 6/2008 | Isono et al. | 277/650 |

* cited by examiner

*Primary Examiner*—Jefferson Evans

(57) ABSTRACT

A radial top cover gasket is used for sealing a disk drive assembly. In one embodiment, a disk drive assembly includes a baseplate having a sidewall disposed about a periphery of the baseplate. The disk drive further includes a top cover that is disposed within the sidewall of the baseplate. A gasket is then radially compressed between the top cover and an inner face of the baseplate sidewall.

11 Claims, 4 Drawing Sheets

RADIAL TOP COVER GASKET FOR DISK DRIVES

FIELD OF THE INVENTION

The invention relates in general to seals for disk drive assemblies, and in particular to top cover gaskets for disk drives.

BACKGROUND OF THE INVENTION

Disk drives are typically sealed to protect the drive from dust, condensation and other sources of contamination. Various approaches to sealing disk drive assemblies are known. One such approach is the use of a tape seal that wraps around the outside periphery of the disk drive housing. However, sometimes the integrity of tape seals is not sufficiently reliable.

Another approach has been the use of a gasket that is formed in place on the underside periphery of the top cover. Once the gasket has been formed, the disk drive top cover is pushed down axially onto the top end of the baseplate wall, thereby compressing the formed-in-place gasket between the top cover and the top end of baseplate wall. One drawback to this approach is that a relatively thick baseplate wall (e.g., 2 mm for 1.8-inch drives and 1 mm for 1-inch drives) is required to accommodate the o-ring. This leaves less available space within the disk drive assembly for use by other components, which is particularly disadvantageous in the context of microdrives (e.g., 1-inch drives) where internal drive space is more limited. As such, what is needed is an improved top cover gasket which overcomes one or more of the aforementioned drawbacks.

SUMMARY OF THE INVENTION

A radial top cover gasket for disk drives is disclosed and claimed herein. In one embodiment, a disk drive includes a baseplate having a sidewall disposed about a periphery of the baseplate. The disk drive further includes a spindle motor attached to the baseplate, a disk mounted on the spindle motor, and an actuator coupled to the baseplate, where the actuator has a head attached thereto for reading data from the disk. In this embodiment the disk drive also includes a top cover having a major surface and being disposed within the sidewall, and a gasket radially compressed between the top cover and an inner face of the sidewall.

Other aspects, features, and techniques of the invention will be apparent to one skilled in the relevant art in view of the following detailed description of the exemplary embodiments.

DETAILED DESCRIPTION OF THE EXEMPLARY EMBODIMENTS

The invention relates to a radial top cover gasket for sealing a disk drive assembly. In one embodiment, a disk drive assembly includes a baseplate having a sidewall disposed about a periphery of the baseplate. The disk drive further includes a top cover that is disposed within the sidewall of the baseplate. A gasket is radially compressed between the top cover and an inner face of the baseplate sidewall. This radial compression causes a reactionary force in the same plane in which the radial compression occurs, thereby forming a seal between the top cover and the sidewall.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1A:
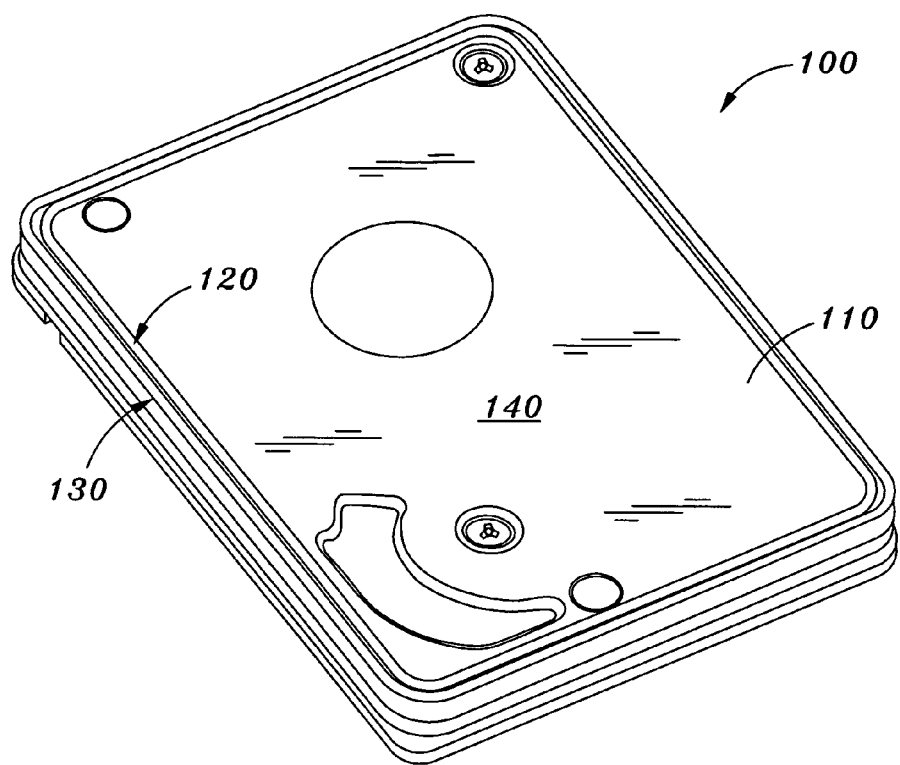
FIG. 1A depicts a perspective view of a disk drive assembly sealed with a radial top cover gasket in accordance with one embodiment of the invention.
Figure 1B:
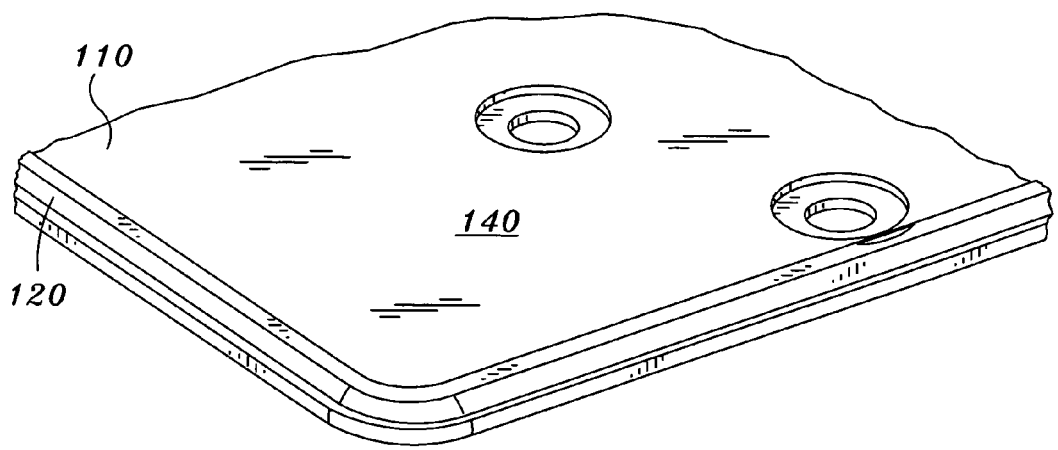
FIG. 1B depicts a perspective view one embodiment of a radial top cover gasket attached to the top cover of FIG. 1A.

Referring now to FIG. 1A, depicted is a disk drive assembly 100 comprised of a top cover 110 sealed with a radial gasket 120 to a baseplate sidewall 130. FIG. 1B depicts the top cover 100 prior to installation with the attached radial gasket 120. As shown in both FIGS. 1A-1B, the top cover 110 has a major surface 140 forming the exterior top surface of the disk drive assembly 100.

Figure 2A:
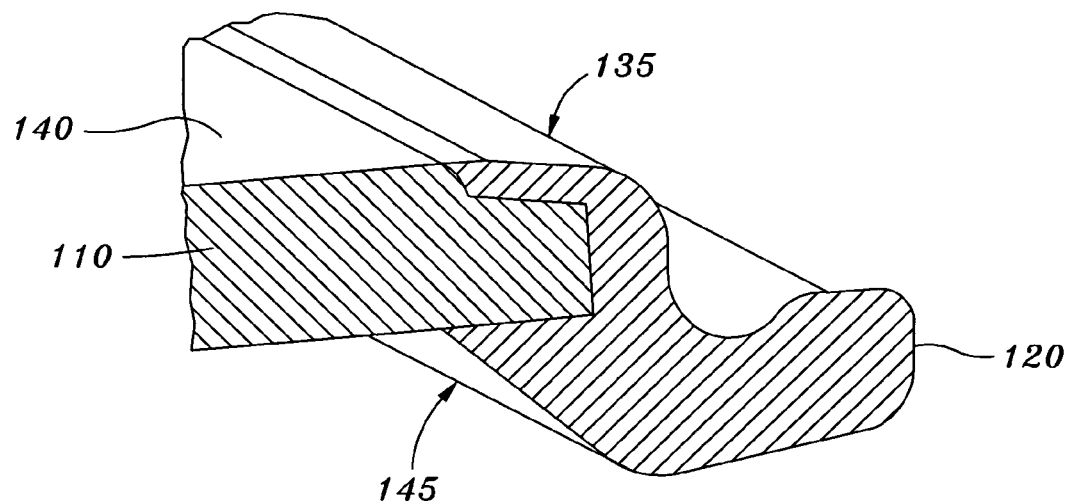
FIG. 2A depicts a cross-sectional view of one embodiment of a radial top cover gasket attached to the top cover of FIGS. 1A-1B.

FIG. 2A depicts the top cover 110 of FIGS. 1A-1B attached to one embodiment of a radial gasket 120 usable in a variety of disk drive assemblies, such as 1-inch drives, 1.8-inch drives, 2.5-inch drives and 3.5-inch drives. While the top cover 110 will typically be metallic in nature, it may be composed of other non-metallic materials (e.g., plastics, ceramics, etc.). With respect to the gasket 120, in certain embodiments it will be comprised of an elastomer, such as fluorocarbon elastomer (FKM), thermoplastic elastomer (TPE) or ethylene propylene diene rubber (EPDM).

As shown in FIG. 2A, this embodiment of the radial gasket 120 utilized a cleated design comprised of a top cleat 135 and a bottom cleat 145, with a tapered end of the top cover 110 being disposed there between. As shown, the top cleat 135 may be flush with the major surface 140 of the top cover 110, where the major surface 140 is oriented essentially parallel to a radial direction (r) and normal to an axial direction (a). While it should be appreciated that the gasket 120 may be attached to the top cover 110 using a variety of techniques, in certain embodiments the gasket 120 is attached using any one of injection molding, compression molding, thermoforming or dip molding. The gasket 120 may similarly be attached to the top cover 110 using an adhesive.

Figure 2B:
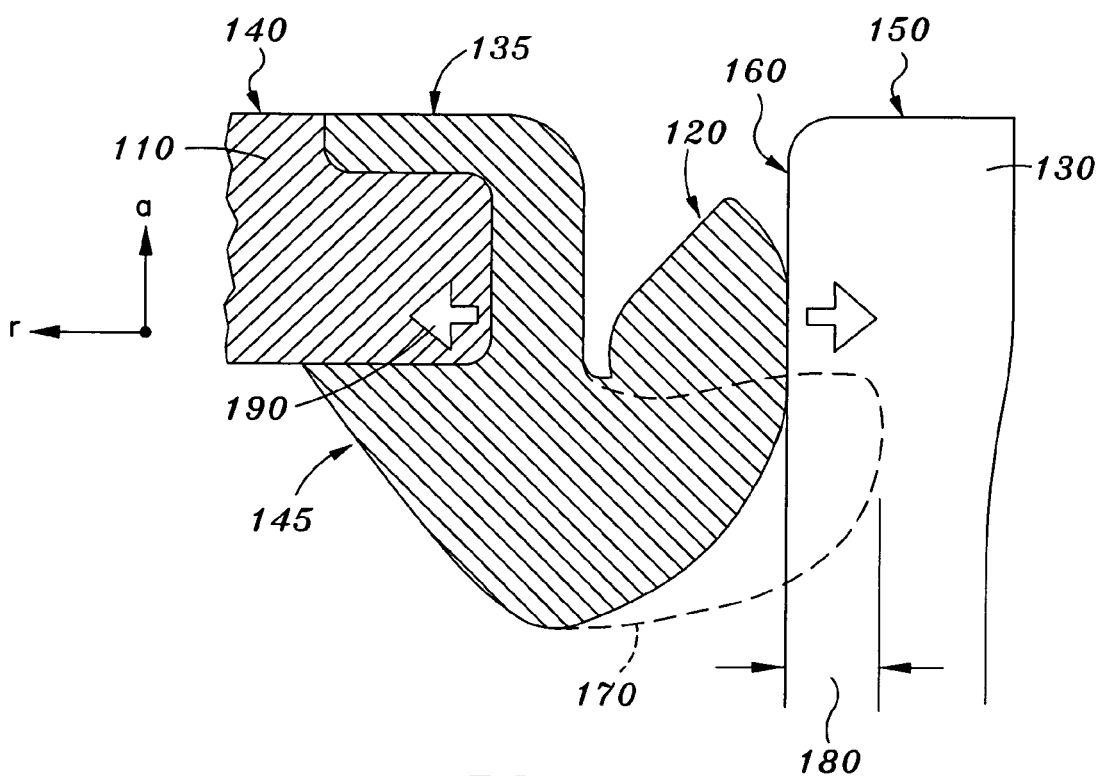
FIG. 2B depicts a cross-sectional view of one embodiment of the radial top cover gasket of FIG. 2A after installation.

Referring now to FIG. 2B, depicted is the top cover 110 with attached radial gasket 120 in an installed position. As shown, when installed the radial gasket 120 undergoes radial compression between the top cover 110 and an inner face 160 of the baseplate sidewall 130 along the radial direction (r). As shown, the radial direction is essentially parallel to the major surface 140 and normal to the inner face 160. This radial compression causes the radial gasket 120 to undergo a radial strain defined as the amount of deformation 180 that the gasket 120 undergoes during the installation process, divided by the un-deformed length 170 of the gasket 120. In one embodiment, this radial strain is between 10% and 50%. Radially compressing the gasket 120 further causes a reactionary force 190 in the same plane as the radial direction (r), thereby forming a seal between the top cover 110 and sidewall 130. In one embodiment, this seal is an airtight seal.

It should be appreciated that the aforementioned radial compression will tend to cause the radial gasket to deform (e.g., deformation 180) in some manner, such as being folded back towards the top cover 110 as shown in FIG. 2B. However, in certain embodiments such deformation may occur without causing the gasket 120 to protrude above the major surface 140 of the top cover 110. Similar, an installed gasket 120 may experience such deformation without protruding beyond the exposed end 150 of the baseplate sidewall 130. As such, the outside dimensions of a disk drive assembly (e.g., disk drive assembly 100) are unaltered by the gasket 120.

Figure 3A:
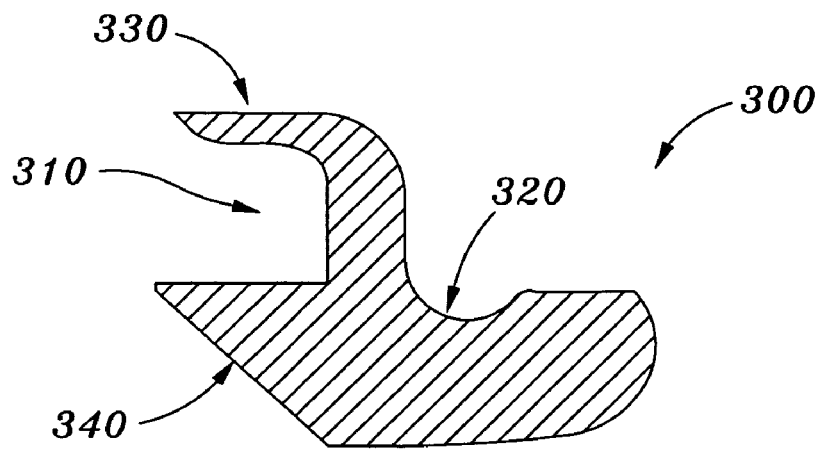
FIGS. 3A-3C depict cross-sectional views of various embodiments of radial top cover gaskets prior to being attached to top covers.
Figure 3B:
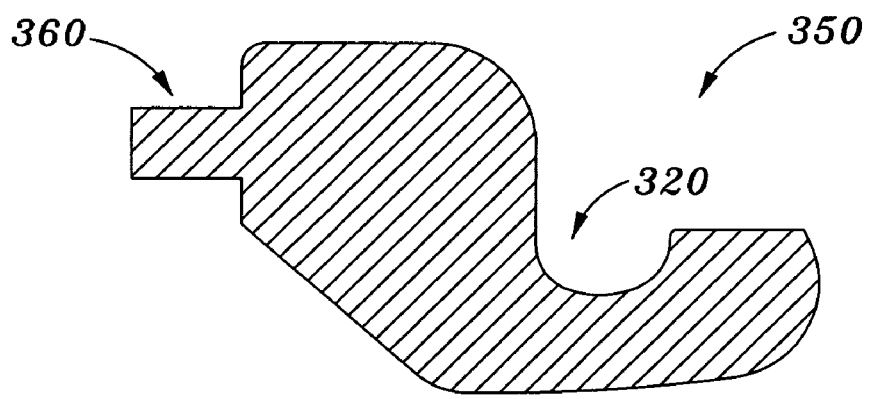
Figure 3C:
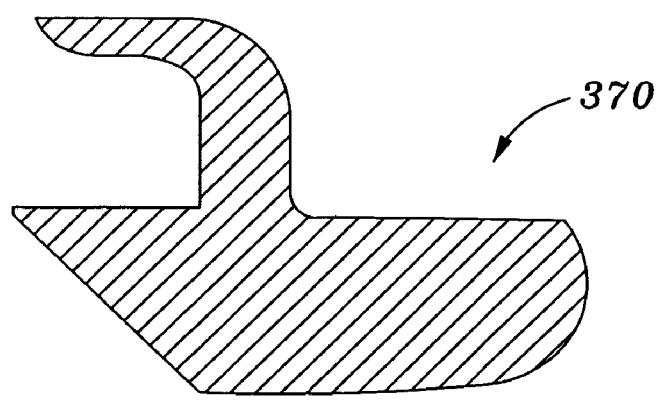

Referring now to FIGS. 3A-3C, depicted are cross-sectional views of various embodiments of radial top cover gaskets prior to being attached to top covers. FIG. 3A, for example, depicts a radial gasket 300 having the same cleated-design of FIGS. 2A-2B. In particular, gasket 300 is comprised of a top cleat 330 and a bottom cleat 340, as well as a receiving portion 310 for accommodating a tapered end of a top cover (e.g., top cover 110). Gasket 300 is also designed with an optional unfilled portion 320, as shown in FIG. 3A, which in certain embodiments may facilitate a folding reaction in response to radial compression during installation, such as that of FIG. 2B.

FIG. 3B depicts another embodiment of a radial gasket 350 in which, instead of a cleated-design, an insert portion 360 is used to attach the gasket 350 to a top cover. In one embodiment, the top cover would be designed to accommodate the insert portion 360, such as into a recessed area into the side of the top cover. Gasket 350 is also designed with the optional unfilled portion 320 of FIG. 3A.

FIG. 3C depicts yet another embodiment of a radial gasket 370 in which a cleat-design is used, as with gasket 300 of FIG. 3A. However, in this embodiment gasket 370 does not include an unfilled portion (e.g., portion 320).

Figure 4:
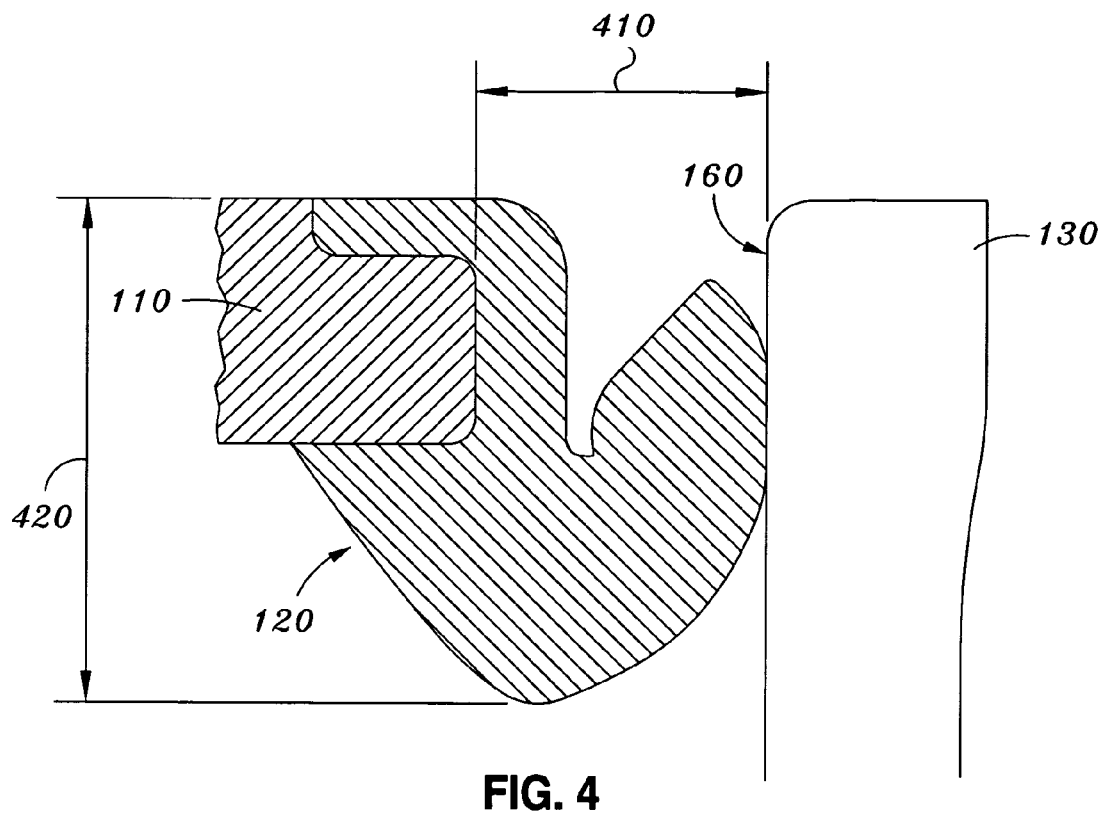
FIG. 4 depicts another view of the radial top cover gasket of FIGS. 2A-2B.

FIG. 4 depicts a cross-sectional view of the gasket 120 described above with reference to FIGS. 2A-2B. As shown, the radial gasket 120 forms an interface 410 between the top cover 110 and the inner face 160 of the sidewall 130. This interface 410, which forms a seal between the top cover 110 and the baseplate sidewall 130, may have a width of between 0.2 mm and 10 mm. In addition, FIG. 4 depicts the gasket 120 as having a height 420 measured parallel to the sidewall 130. In certain embodiments, this height 420 may be between 5% and 50% of an overall height for the disk drive assembly into which the gasket 120 is installed (e.g., disk drive assembly 100).

Figure 5:
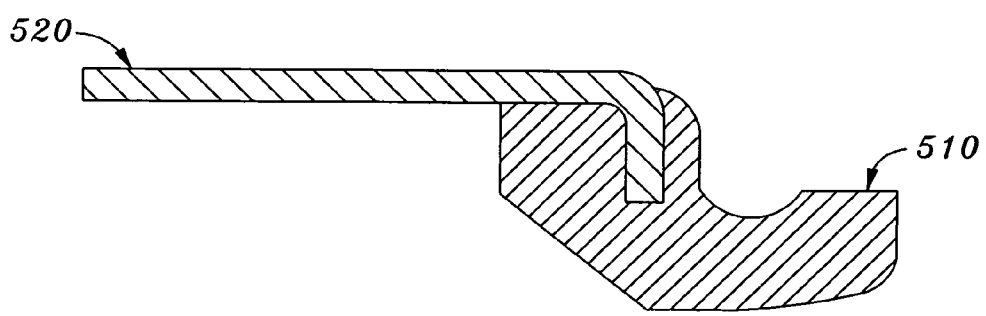
FIG. 5 depicts another embodiment of a radial top cover gasket after being attached to a top cover.

FIG. 5 depicts another embodiment of how a radial gasket 510, designed in accordance with one embodiment of the invention, may be attached to a top cover 520 of a disk drive assembly. As shown, rather than employing a cleated-design to accommodate a tapered end of the top cover 520, the radial gasket 510 of FIG. 5 is configured to receive a lip of the top cover 520. As with the embodiment of the radial gasket 120 of FIG. 2A-2B, gasket 510 may be attached to the top cover 520 using any one of injection molding, compression molding, thermoforming or dip molding. Gasket 510 may similarly be attached to the top cover 520 using an adhesive.

While the invention has been described in connection with various embodiments, it will be understood that the invention is capable of further modifications. This application is intended to cover any variations, uses or adaptations of the invention following, in general, the principles of the invention, and including such departures from the present disclosure within the known and customary practice in the art to which the invention pertains.

What is claimed is:

1. A disk drive comprising:
a baseplate having a sidewall disposed about a periphery of the baseplate;
a spindle motor attached to the baseplate;
a disk mounted on the spindle motor;
an actuator coupled to the baseplate, the actuator having a head attached thereto for reading data from said disk;
a top cover having a major surface and being disposed within the sidewall; and
a gasket radially compressed in a direction parallel to the major surface, between the top cover and an inner face of the sidewall that is perpendicular to the major surface,
wherein the sidewall has an exposed end defining a plane essentially normal to a major surface of the sidewall, and
wherein the gasket does not protrude beyond said plane.

2. The disk drive of claim 1, wherein the gasket comprises an elastomer selected from a list consisting of: fluorocarbon elastomer (FKM), thermoplastic elastomer (TPE) and ethylene propylene diene rubber (EPDM).

3. The disk drive of claim 1, wherein the gasket is attached to the top cover.

4. The disk drive of claim 3, wherein the gasket is attached to the top cover using a process selected from the list consisting of: injection molding, compression molding, thermoforming and dip molding.

5. The disk drive of claim 3, wherein the gasket is attached to the top cover using an adhesive.

6. The disk drive of claim 1, wherein the gasket has a height measured parallel to the sidewall that is between 5% and 50% of an overall height for said disk drive.

7. The disk drive of claim 1, wherein the gasket forms an interface between the top cover and the inner face, said interface having a radial width of between 0.2 mm and 10 mm.

8. The disk drive of claim 1, wherein the gasket undergoes a radial strain in a direction parallel to the major surface, during radial compression between the top cover and the sidewall, of between 10% and 50%.

9. The disk drive of claim 1, wherein the major surface defines a plane beyond which the gasket does not protrude.

10. A disk drive comprising:
a baseplate having a sidewall disposed about a periphery of the baseplate;
a spindle motor attached to the baseplate;
a disk mounted on the spindle motor;
an actuator coupled to the baseplate, the actuator having a head attached thereto for reading data from said disk;
a top cover having a major surface and being disposed within the sidewall; and a gasket radially compressed in a direction parallel to the major surface, between the top cover and an inner face of the sidewall that is perpendicular to the major surface, wherein the top cover is attached to the actuator.

11. A disk drive comprising:
a baseplate having a sidewall disposed about a periphery of the baseplate;
a spindle motor attached to the baseplate;
a disk mounted on the spindle motor;
an actuator coupled to the baseplate, the actuator having a head attached thereto for reading data from said disk;
a top cover having a major surface and being disposed within the sidewall; and
a means for radially sealing the top cover to an inner face of the sidewall that is perpendicular to the major surface, wherein the top cover is attached to the actuator.

* * * * *